UNITED STATES PATENT OFFICE.

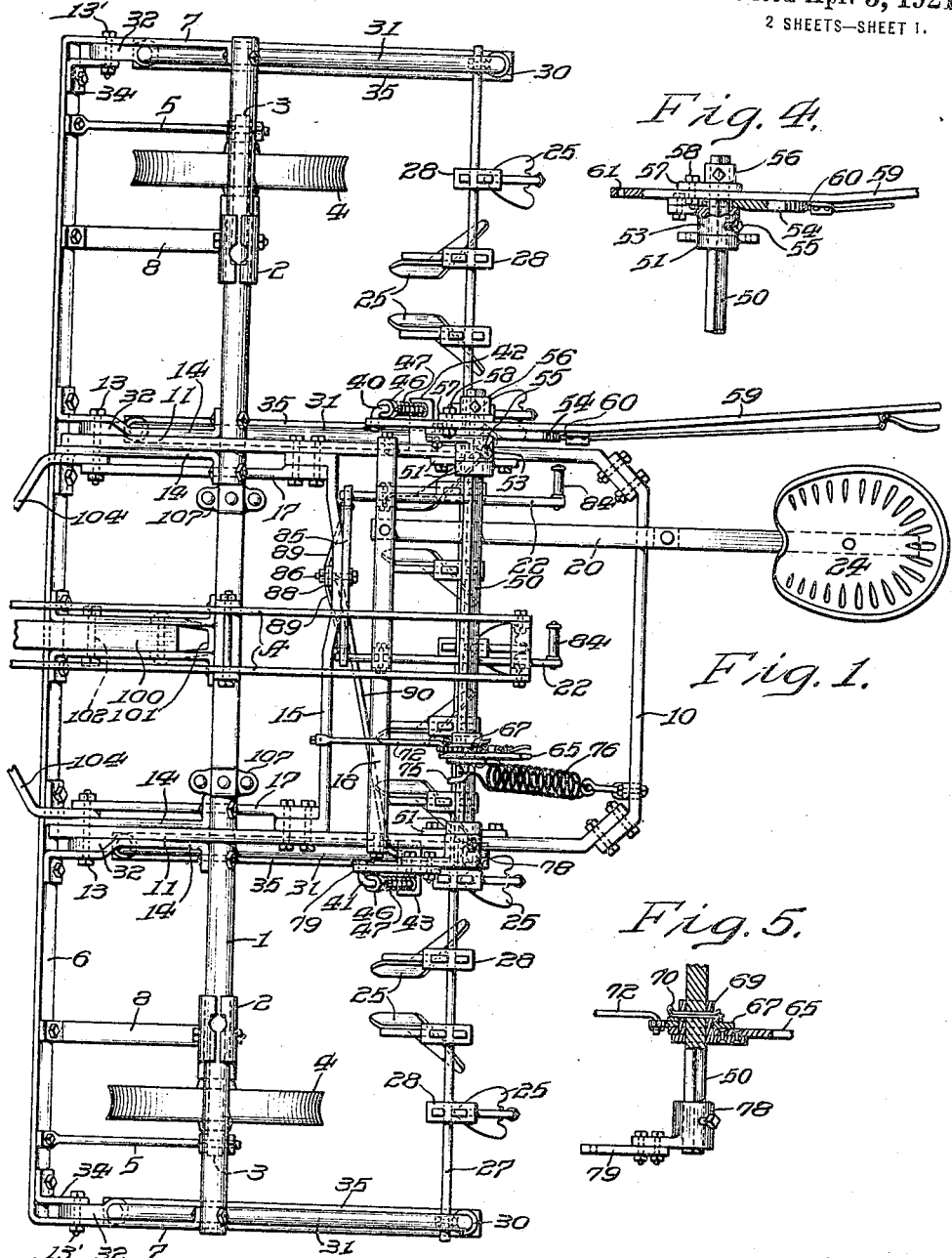

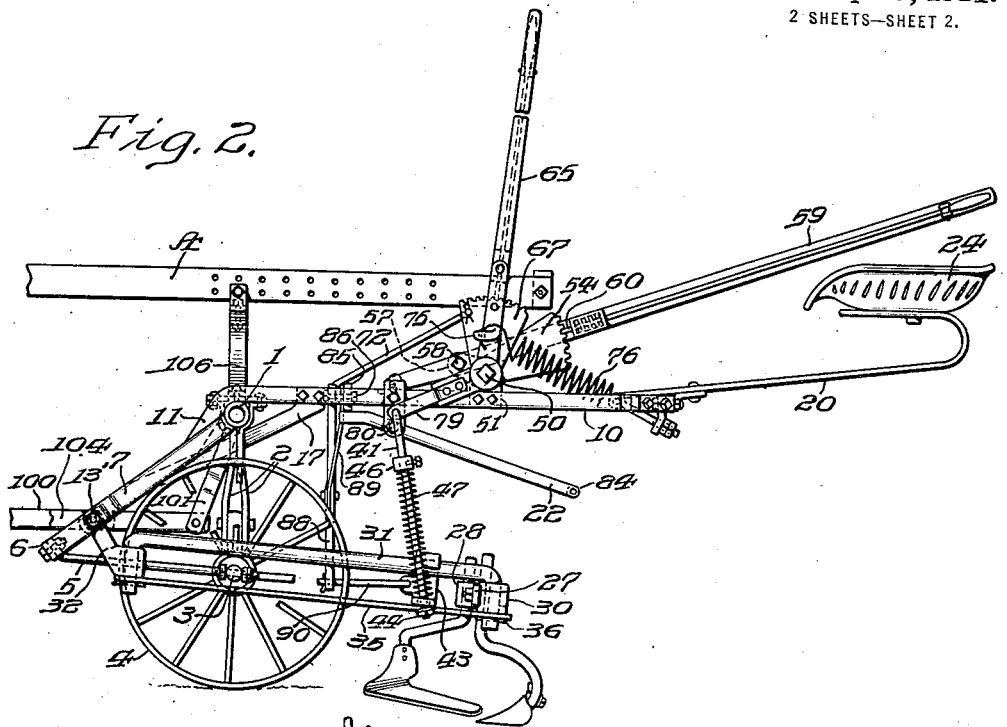
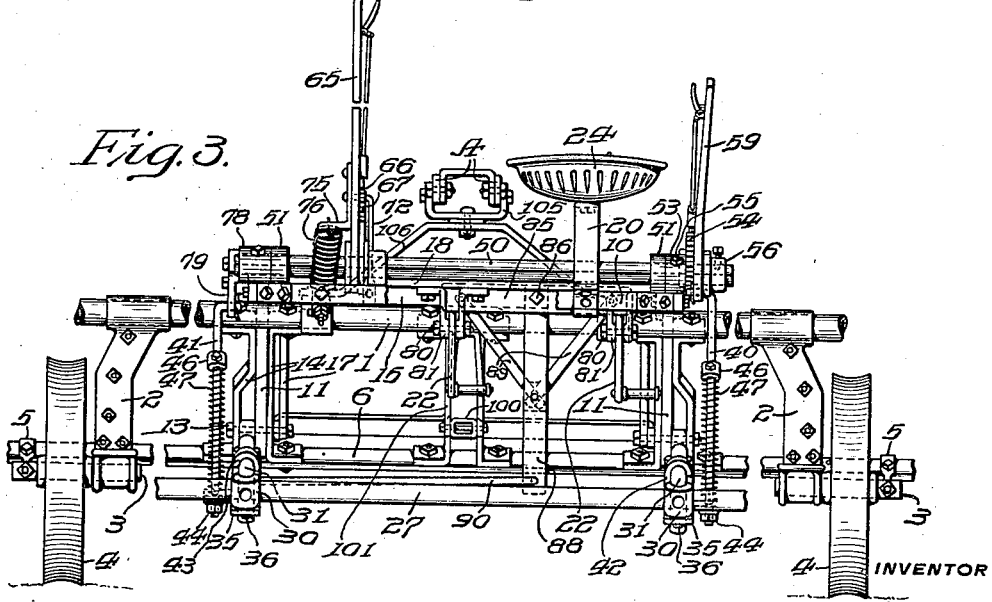

JAMES MONROE BOWEN, OF CAPE MAY COURT HOUSE, NEW JERSEY, ASSIGNOR TO S. L. ALLEN & CO., INC., A CORPORATION OF PENNSYLVANIA.

AGRICULTURAL IMPLEMENT.

1,373,858.  Specification of Letters Patent.  Patented Apr. 5, 1921.

Application filed May 14, 1920. Serial No. 381,291.

*To all whom it may concern:*

Be it known that I, JAMES MONROE BOWEN, a citizen of the United States, and a resident of Cape May Court House, county of Cape May, and State of New Jersey, have invented certain new and useful Improvements in Agricultural Implements, of which the following is a specification, reference being had to the accompanying drawings.

My invention relates to agricultural implements adapted to be drawn by suitable motive power such as a tractor or horses, and comprehends the provision of means whereby the operator, riding on the implement, may control the same in such manner as to cause the ground working tools to follow the rows of plants independently of the general direction of travel of the tractor, horses, or other means by which the implement is being drawn.

While my invention may be embodied in agricultural implements of different forms intended for use in various operations incident to agriculture, it is particularly adapted for use in cultivators, and more especially those intended for the simultaneous cultivation of a plurality of substantially parallel rows of plants, and I have, therefore, herein illustrated and described the invention as embodied in a cultivator primarily intended for the cultivation of beets or the like.

It will be understood that in modern farming operations it is customary to plant the seeds of beets and similar plants mechanically by means of a machine which simultaneously deposits the seeds in a plurality of parallel rows as it is drawn across the field, so that when the plants emerge from the ground the rows thereof are equidistantly spaced but frequently follow a somewhat sinuous course, depending on the amount which the seeding machine has deviated from a straight line in its passage over the field. Under these conditions, in subsequent cultivating operations it is requisite to accurately direct the cultivator along the rows, since if the cultivator blades are initially set close enough to the plants to effect the desired degree of cultivation, a relatively slight deviation of the implement from the direction of the rows will cause the blades to cut into the plants to their resulting injury. In practice it has been found extremely difficult to guide the tractor which serves to draw the cultivator with sufficient accuracy to cause the cultivator blades to follow the rows, especially when the cultivating implement is of a type intended to effect the simultaneous cultivation of a plurality of rows, and a principal object of my invention therefore is the provision, in a cultivator or similar implement, of means for effecting lateral shifting of the ground working tools in either direction to enable the operator to cause the tools to accurately follow the rows without altering the general direction of travel of the tractor, or other means, by which the implement is being drawn across the field.

Further objects of my invention are to provide in a cultivator or agricultural implement intended for simultaneous operation on a plurality of rows of plants, means operable by the feet of the operator for laterally shifting the cultivator blades or other tools as may be desired, without altering the general direction of travel of the implement, so that the hands of the operator are left free for the performance of any other function, such as guiding the implement or controlling the motive power supplying means by which it is drawn, raising or lowering the cultivator blades, or the like; said means for causing such lateral shifting being so arranged and of such character that their actuation may be effected by a natural and easy movement of the feet and without undue fatigue even though the implement be continuously operated over long periods of time.

Still further objects of my invention are to provide in a cultivator having the foregoing characteristics, means under the control of the operator for adjusting the height of the ground working tools so that the proper depth of cut may be taken under all conditions of operation, said means being of a character to permit the simultaneous and parallel elevation or depression of all of the tools or blades or to permit the tool carrying means to be elevated or depressed more at one end than at the other, so that in traveling over a level surface the tools toward one side of the implement may be caused to enter the ground more deeply than the other, or when operating on inclined surfaces, adjustment of the tools may be effected so that all of the tools will enter the soil for an equal depth; and to provide means whereby all of the tools may be simultaneously raised or lowered independently of the position of angularity to which the tool carrying means may have been adjusted as aforesaid.

My invention further includes all of the other various novel objects and features of construction and arrangement hereinafter more definitely specified and described.

While in carrying out my invention I may employ any suitable instrumentalities and combinations thereof for effecting the functions intended, I have illustrated, in the accompanying drawings, and will now proceed to describe an implement embodying my invention and intended primarily for the cultivation of beets, and adapted to simultaneously operate on four rows of plants, Figure 1 being a top plan view of the implement; Fig. 2, a side elevation; Fig. 3, a fragmentary rear elevation, and Figs. 4 and 5, respectively fragmentary views, partially in section, showing details of the device.

The form of implement illustrated comprises a main, transversely extending supporting bar 1 conveniently formed from a piece of pipe, from which downwardly depends a pair of axle supports 2 secured to the bar and each serving at its lower end to receive one end of an axle 3 about which revolves a wheel 4, the other ends of each of the axles being transversely bored for the reception of an adjusting rod 5 which passes through the axle and is secured at its forward extremity to the bracket-bar 6 which extends entirely across the front of the implement parallel to, forward of, and considerably below the supporting bar 1, the ends 7 of the bracket-bar being bent at right angles to its main portion and secured to the extremities of the supporting bar. Braces 8 extend between the lower ends of the axle supports and the bracket-bar to assist in imparting rigidity to the former.

A substantially U-shaped main frame 10 is provided, the major portion thereof being horizontally disposed and extending rearwardly from the supporting bar 1 on which it rests, the forward ends 11 of the U being directed downwardly from the supporting bar toward the bracket bar and secured in fixed position with respect thereto by transversely extending bolts 13, each of which passes through one of the ends 11 as well as a pair of laterally spaced braces 14 extending between the supporting bar 1 and the bracket-bar 6 with their ends respectively secured to these parts, the bolts 13 also being effective to secure certain other parts in position as hereinafter described. Located in the rear of the supporting bar 1, extending between the side members of the main frame and suitably secured thereto, is a cross member 15 which serves both to strengthen the frame and as a support for certain mechanism hereinafter described, while a pair of braces 17 is arranged to extend downwardly and forwardly from adjacent this cross member to the bolts 13 with which they engage, the whole arrangement being such that the bracket-bar 6, main frame and cross member are rigidly supported from and upon the supporting bar 1 to form a strong, rigid, unitary whole embodying but a minimum number of parts. A second cross member 18 is also preferably arranged to extend transversely between the side members of the main frame to which it is suitably rigidly secured and serves as a support for the inner end of the seat bar 20 as well as for the footlevers 22 hereinafter described. The seat bar which may conveniently be offset to one side of the center line of the machine so as to give the operator a clear view along one of the rows being cultivated, passes rearwardly over the main frame and carries adjacent its outer end the seat 24.

For supporting the cultivating blades or other ground working tools 25 which may be of any suitable or desired form, a transversely extending gang bar 27 is provided, and the tools are preferably adjustably secured in fixed operative relation with the bar by any suitable means such as clamps 28, as will be well understood by those familiar with the art, the specific construction of the tools and means for securing them to the gang bar forming no part of the present invention. The gang bar is provided, preferably adjacent each end and at suitable points between its ends, with vertically disposed, cylindrical sockets 30 bolted to the gang bar which are adapted to receive the downwardly turned rear ends of the substantially longitudinally extending draft rods 31 which may be of any desired number, four being employed in the form of the invention shown. The forward end of each of the draft rods is turned downwardly and engages in a vertically disposed, cylindrical aperture in one of a plurality of draft rod brackets 32 secured adjacent the bracket bar 6 in vertically movable relation therewith by the bolts 13, 13', which latter extend through the ends 7 of the bracket bar and through rearwardly and upwardly turned clips 34 secured to the bar adjacent thereto. It will be understood that the ends of the draft rods are capable of rotation both within the sockets 30 and draft rod brackets 32 and that the latter, being horizontally pivoted on the bolts 13, 13', are capable of movement in a vertical plane about the bolts. A preferably flat link 35 is positioned beneath each of the draft rods and provided with an aperture adjacent each end, these apertures being adapted to receive the ends of the draft rod which respectively project downwardly beyond the lower face of the adjacent socket 30 and bracket 32, cotter pins 36 extending through the ends of the rod serving to hold the link in position.

For adjustably supporting the gang bar from the main frame 10, suitable mechanism is provided which may conveniently comprise a pair of vertically extending rods 40, 41, the lower ends of which extend loosely through the horizontal portions of substantially L-shaped clips 42, 43, the extremities of the vertical portions of which are curved over and around the adjacent draft rods 31, as best shown in Fig. 3, or otherwise suitably secured thereto, nuts 44 on the extremities of the rods 40, 41, serving to prevent the latter from pulling through the apertures in the clips. Each of the rods is provided with a collar 46 adjustably secured in position thereon by means of a set screw, and a spring 47 is disposed about the rod between the collar and the clip so that normally the latter is forced downwardly toward the end of the rod, but can slide thereon against the tension of the spring if pushed upwardly with sufficient force, thereby minimizing the likelihood of injury to the tools in case of contact with a stone or other obstruction. Extending transversely across and above the main frame 10 is a squared shaft 50 rotatably supported on a pair of brackets 51 bolted to the side members of the frame and adjacent that end of the shaft nearest the rod 40 a collar 53 to which is bolted a notched quadrant 54 is secured to the shaft by a set screw 55 or in any other convenient manner, while another collar 56, having a lug or projection 57 adapted for the reception of a pivot bolt 58, is also secured on the shaft in such position that a hand lever 59 carrying the usual spring controlled dog 60 and pivoted on the pivot bolt 58 is in such position that the dog is in coöperative relation with the quadrant, the lever being extended rearwardly to a point for convenient operation from the seat 24. The lever is also extended in the opposite direction, that is, forwardly, from the bolt, and provided with an aperture 61 adapted to receive the laterally turned end of rod 40, so that movement of the lever about its pivot bolt 58 will serve to raise or lower the rod 40 and, in turn, the adjacent draft rod, which motion is communicated to the gang bar to raise and lower that end of the same most nearly adjacent the lever. Hence by suitable manipulation of the latter the gang bar may be inclined upwardly or downwardly to any desired position within the limits of vertical movement of the rod 40, and locked therein by engagement of the dog in the quadrant.

For raising and lowering the gang bar as a whole, without disturbing the angularly adjusted position in which it may have been placed by manipulation of lever 59, a master lever 65 is provided having a hand controlled spring actuated dog 66 coöperative with a notched quadrant 67. The lever is mounted on a flanged collar 69 to which it is rigidly secured and which, in turn, is non-rotatably mounted on the squared shaft and held in position thereon by cotter pins 70. The quadrant is provided with an aperture through which the collar extends and in which it is capable of rotation, and for holding the quadrant in an upright position, a rod 72 extends forwardly therefrom and is attached to any convenient portion of the machine such as the cross member 15. The lever is provided with a hook shaped lug 75 over which is hooked one end of a relatively heavy spring 76, the other end of which is secured to the main frame 10, for a purpose to be hereinafter described. Adjacent that end of the shaft nearest the master lever 65 which may conveniently be upon the opposite side of the operator's seat from that on which the lever 59 is arranged, is a collar 78 carrying a forwardly and downwardly projecting arm 79 through an aperture in the end of which passes the laterally turned end of the rod 41, the various parts just described being so arranged that movement of the master lever will serve to cause the rotation of the shaft 50 and consequently raise or lower the rods 40 and 41, and in turn the draft rods and the gang bar, without reference to, or disarrangement of, the angular position to which the bar may have been adjusted by manipulation of the lever 59, since that lever and its adjacent mechanism, whatever be its position of adjustment, moves unitarily with the shaft 50 when the latter is rotated by the master lever, although when desired the lever 59 may be moved relatively to the squared shaft whatever be the position of the master lever. Hence, by suitable manipulation of the lever 59, any desired angular adjustment of the gang bar may be secured, while by suitable manipulation of the master lever the blades may be withdrawn from the ground or forced into it, as required in the operation of the implement, the spring 76 serving to assist the operator in raising the gang bar.

Suitable means are provided for permitting the operator to effect lateral movement in either direction of the gang bar in order that the ground working tool may be caused to follow the rows of plants with the required accuracy independently of the general direction in which the implement is being drawn, said means, in the embodiment of the invention illustrated, comprising a pair of foot levers 22 horizontally pivoted on suitable pivot bolts 80 extending through lugs 81 rigidly secured to the cross member 18 or other convenient portion of the implement. The rear ends of the foot levers are provided with foot rests 84 conveniently arranged for engagement by the operator's feet, and the forward ends are positioned beneath, and normally rest against, the lower edge of a cross lever 85 centrally pivoted on a pivot bolt 86 passing horizontally through the cross member 15. On the opposite side of the cross member a downwardly depending arm 88 is also pivoted at its upper extremity on the pivot bolt, and a pair of diagonally disposed braces 89 serves to connect the arm with the cross lever 85 so that the arm and lever constitute a T-shaped, rigid, operatively unitary structure. The lower end of the arm is suitably connected, as by a rod 90, with one of the clips 43 or other convenient portion of the mechanism movable with the draft rods or gang bar in such manner that movement of the cross lever through the medium of the foot levers will serve to pull or push the rod 90 longitudinally and in turn move the gang bar laterally to the right or left with respect to the frame of the implement in accordance with the direction of rotation imparted to the cross lever. Hence, for example, the operator by depressing the right hand foot lever may readily shift the gang bar to the right and vice versa when required in the operation of the implement in order to cause the ground working tools to follow any slight curves or irregularities in the rows of plants, and as the gang bar in operation is drawn after the bracket bar by the loosely swinging draft rods, it will, except when forced to one side or the other by shiftable operation of the foot levers, normally track behind the draft bar without deviating from the direction in which the implement is being drawn. Furthermore, the gang bar is at all times and under all conditions of operation maintained in parallel relation with the bracket-bar 6 and supporting bar 1, so that the ground working implements are always in proper position to perform their function, and by reason of the tendency of the draft rods to at all times maintain a position normal to the bracket-bar and parallel to the general direction of travel of the implement, the gang bar is immediately returned to its normal position after it has been subjected to a lateral shifting as soon as the operator releases the pressure on the foot lever. Hence, under normal conditions of operation the operator is not required to exert any pressure on the foot levers but merely allows his feet to comfortably rest thereon until he wishes to shift the bar in order to follow some irregularity in the rows, to effect which a slight pressure on the lever immediately brings about the necessary lateral displacement of the gang bar which, as soon as the pressure is released, promptly returns to normal position, these operations being accomplished whatever may be the vertical or angular adjustment of the gang bar as determined by the position of the levers 59 and 65.

Means of any suitable or convenient form are provided for connecting the implement with the tractor or other means operative to draw it over the ground, which may, for example, and as shown in the drawings, comprise a draw bar or tongue 100 positioned centrally of the implement and extending forwardly therefrom, the rear end of the tongue being bolted to a downwardly depending U-shaped member 101, another bolt 102 being conveniently passed through the braces 14 adjacent the tongue to assist in rigidly positioning the latter with respect to the other portions of the implement, a pair of braces 104 anchored at their inner ends to the bolts 13 and secured to the tongue in advance of the implement also assisting in this regard. When the implement is to be used in connection with a tractor having a rearwardly extending beam A means may also be provided for securing the supporting bar 1 to the beam, which may comprise a U-shaped member 105 supported on an upwardly curved support 106, the lower ends of which are secured to seats 107 clamped to the supporting bar, although, if desired, any other means suitable for performing the desired function may be utilized.

While I have illustrated and described with some particularity one form of my invention as embodied in a cultivating implement adapted for simultaneous cultivation of four rows of plants, I do not thereby desire or intend to limit myself specifically thereto, as the invention may be utilized in connection with other forms of implements and with substantially similar forms of implements intended for the simultaneous cultivation of a greater or less number of rows, and modifications and changes may be made in the various details of construction and arrangement, without departing from the spirit and scope of the invention as defined in the appended claims.

Having thus described my invention, I claim and desire to protect by Letters Patent of the United States:

1. In an agricultural implement, the combination of a frame, a member below and fixed with respect thereto, wheel supporting means below said frame and in rear of said member, supporting wheels carried by said means, a gang bar, draft rods operative to movably connect said gang bar with said member, foot controlled mechanism operative to effect lateral shifting of the gang bar with respect to said member, and manually operated means for elevating and depressing said gang bar with respect to said frame.

2. In an agricultural implement, the combination of a frame, a member below and fixed with respect thereto, wheel supporting means below said frame and in rear of said member, wheels carried by said means, a gang bar, draft means comprising a plurality of draft rods extending between said member and said gang bar, foot actuated mechanism operative to effect lateral displacement of the gang bar with respect to said member, and manually controlled lever mechanism for effecting vertical adjustment of said gang bar independently of its laterally shifted position.

3. In an agricultural implement, the combination of a frame, a member below and fixed with respect thereto, supporting means for said frame and wheels supported from said frame, a gang bar, laterally movable draft rods connecting said gang bar and said member and operative to maintain said gang bar normal to the direction of travel of said implement, foot controlled mechanism operative to effect lateral shifting of said gang bar with respect to said member, manually controlled mechanism for effecting vertical angular adjustment of said gang bar, and a master lever for effecting vertical movement of said gang bar without altering the angular adjustment thereof.

4. In an agricultural implement, the combination of a supporting bar, a pair of wheel supports carried by said bar, supporting wheels carried by said supports, a member below, in front of and in rigid relation with said bar, a plurality of brackets carried and vertically movable with respect to said member, a gang bar, laterally movable draft rods connecting said gang bar with said brackets, and foot controlled mechanism operative to effect lateral shifting of said gang bar with respect to said supporting bar.

5. In an agricultural implement, the combination of a supporting bar, a support in rigid relation with said bar, a plurality of brackets vertically movable with respect to said support, a gang bar, laterally movable draft rods connecting said gang bar with said brackets, foot controlled mechanism operative to effect lateral shifting of said gang bar with respect to said supporting bar, manually operated lever mechanism for effecting vertical angular adjustment of said gang bar, and a manually controlled master lever for raising and lowering said bar independently of its vertical angular adjustment or laterally shifted position.

6. In a cultivator, the combination of a frame, wheels supporting said frame, a transversely extending gang bar, a support fixed with respect to said frame, draft means for said gang bar comprising a plurality of draft rods arranged in parallel relation and extending between said support and said gang bar, a pair of foot levers pivoted on said frame, means interposed between said draft bar and said foot levers operative to communicate motion from said levers to said gang bar to effect lateral shifting thereof, independently of its vertically adjusted position, a hand lever connected with said gang bar for effecting vertical angular adjustment of said gang bar, and a master lever also connected with said gang bar for raising and lowering the gang bar with respect to said frame independently of its vertically adjusted or laterally disposed position.

7. In a cultivator, the combination of a frame, a supporting bar, supporting wheels in operative relation therewith, a bracket bar rigid with said supporting bar, a plurality of brackets vertically movable with respect to said bracket bar, a gang bar disposed in the rear of said supporting bar, a plurality of parallel draft rods extending between said gang bar and said brackets and movable with respect thereto, a pair of foot levers pivoted on said frame, means interposed between said levers and said draft rods operative to communicate motion from said levers to said rods, to shift said gang bar laterally, means for vertically supporting said rods with respect to said frame, and manually operated levers for raising and lowering said supporting means whereby vertical angular adjustment of said gang bar may be effected and said gang bar raised or lowered when said gang bar is either in normal or laterally shifted position.

8. The combination in a cultivator having a frame and a gang bar, of a plurality of movable draft rods normally operative to maintain said gang bar at right angles to the direction of travel of the cultivator, a foot controlled lever and connections from said lever to said draft rods, said lever being operative to effect lateral shifting of said gang bar with respect to said frame, a hand lever and connections to the gang bar whereby said gang bar may be vertically angularly adjusted, and a master lever and connections to the gang bar whereby said gang bar may be raised or lowered irrespective of its laterally shifted or vertically angular position.

9. The combination in a cultivator having a frame and a gang bar, of draft means comprising a plurality of draft rods automatically operative to maintain said gang bar at right angles to the direction of travel of the cultivator, a foot controlled lever operative to effect lateral shifting of the gang bar with respect to the frame, a manually operable lever mechanism for effecting vertical angular adjustment of said gang bar, and manually operable master lever mechanism for raising and lowering said gang bar independently of its laterally shifted or vertically angularly adjusted position.

In witness whereof I have hereunto set my hand this 12th day of May, A. D. 1920.

JAMES MONROE BOWEN.

It is hereby certified that in Letters Patent No. 1,373,858, granted April 5, 1921, upon the application of James Monroe Bowen, of Cape May Court-House, New Jersey, for an improvement in "Agricultural Implements," errors appear in the printed specification requiring correction as follows: Page 4, line 45, for the word "shiftable" read *suitable;* page 5, line 44, claim 4, after the word "carried," insert the word *by;* and that the said Letters Patent should be read with these corrections therein that the same may conform to the record of the case in the Patent Office.

Signed and sealed this 7th day of June, A. D., 1921.

[SEAL.]

KARL FENNING,

*Acting Commissioner of Patents.*

Cl. 97—34.